W. E. HALLAWAY.
ATTACHMENT FOR PLOWS AND CULTIVATORS.
APPLICATION FILED JAN. 2, 1912.
1,020,282.
Patented Mar. 12, 1912.
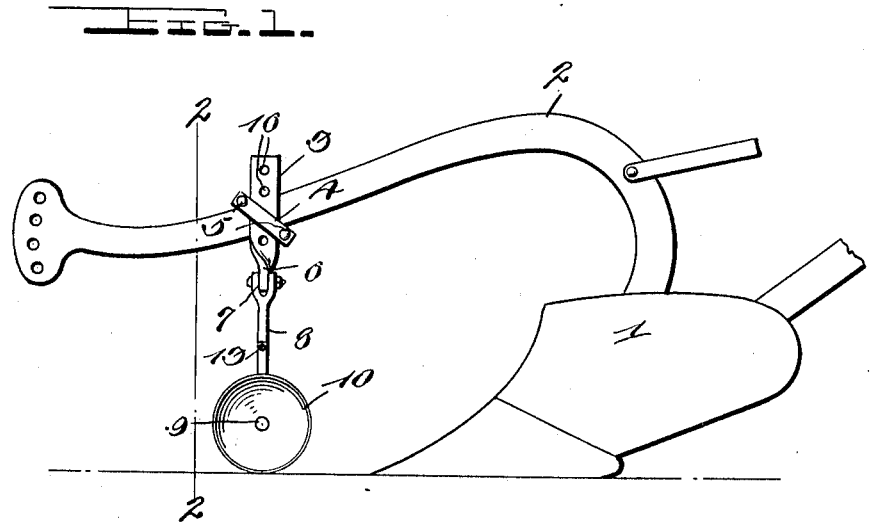
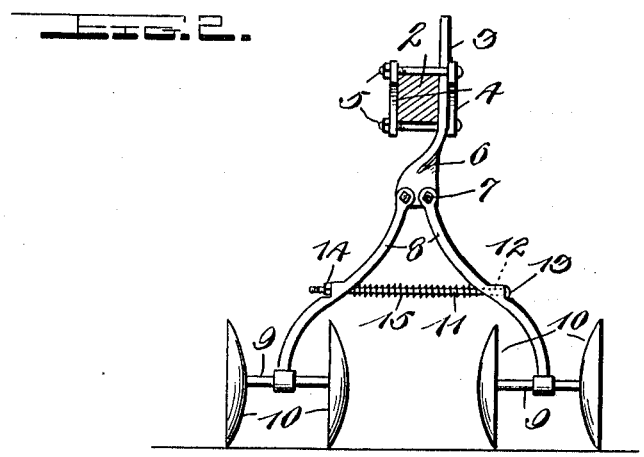
Witnesses
Chas. L. Grieshaber.
G. B. Norton.
Inventor
W. E. Hallaway,
By Watson E. Coleman
Attorney

UNITED STATES PATENT OFFICE.

WALTER E. HALLAWAY, OF MIST, ARKANSAS.

ATTACHMENT FOR PLOWS AND CULTIVATORS.

1,020,282.  Specification of Letters Patent.  Patented Mar. 12, 1912.

Application filed January 2, 1912. Serial No. 668,905.

*To all whom it may concern:*

Be it known that I, WALTER E. HALLAWAY, a citizen of the United States, residing at Mist, in the county of Ashley and State of Arkansas, have invented certain new and useful Improvements in Attachments for Plows and Cultivators, of which the following is a specification, reference being had to the accompanying drawings.

This invention relates to new and useful improvements in attachments for plows and cultivators and has for its object to cut vines and other growths when plowing or to cut up sweet potato vines, etc., when digging the potatoes, as this attachment can be readily secured to the beam of a potato digger.

Another object of the invention is to provide an attachment which will be adjustably and removably secured to a plow beam and can also be adjustably and removably secured to a cultivator when so desired.

A further object of the invention is to provide a device of this character which will possess advantages in points of efficiency and durability, is inexpensive of manufacture and at the same time is simple in construction and operation.

With the above and other objects in view, the invention consists in the novel features of construction and the combination and arrangement of parts hereinafter more fully described, pointed out in the claims and shown in the accompanying drawings, in which—

Figure 1 is a side elevation of a plow showing my improved attachment applied thereto; and Fig. 2 is a sectional view on the line 2—2 of Fig. 1.

Referring more particularly to the drawings 1 indicates any suitable form of plow, having the beam 2. The plow and beam, as well as other parts, excluding the attachment, are to be of any preferred and suitable construction.

Secured to the beam 2 at any desired distance in front of the plow is a vertically disposed arm 3 which is adjustably and removably secured by means of the clamping members 4 disposed upon each side of the beam 2 and secured by means of the bolts 5 passing through each end thereof and arranged upon the upper and lower edge of the plow beam. The arm 3 is twisted as shown at 6 so that the lower end of the same is disposed in a plane at right angles to the body portion. Hinged to the lower end of the arm 3 as shown at 7 are the curved arms 8, having their lower ends disposed upon opposite sides of the beam 2. Horizontal shafts 9 are carried by the lower end of the arms 6, having the cutting disks 10 mounted upon each end thereof. A rod 11 is mounted in the openings 12 in the arms 8, having a head 13 formed on one end, the other end of said rod being threaded to receive the nut 14 which is adapted to be tightened or loosened to increase or decrease the space between the arms 8. A coiled spring 15 is mounted on the rod 11 and disposed between said arms to force them apart when the nut 14 is loosened. Thus it will be seen that the arms 8 may be adjusted according to the width of the row in which the disks 10 are to be used.

In securing this attachment to a cultivator I have provided the bar 3 with a plurality of openings 16 whereby the attachment may be adjustably secured to any suitable part of a cultivator by means of bolts or other suitable means can be used if desired.

From the above description, taken in connection with the accompanying drawings, the advantages, operation and use of my improved attachment will be readily understood.

While I have shown and described the preferred form of my invention, it will be obvious that various changes in the details of construction and in the proportions may be resorted to for successfully carrying my invention into practice without sacrificing any of the novel features of construction or departing from the scope thereof.

Having thus described the invention what is claimed is:—

1. In a device of the character described, the combination of a vertically disposed bar adapted to be secured to a plow beam, said bar being twisted so that the lower end is disposed in a plane at right angles to the body portion, curved arms hinged to the lower end of said bar, cutter disks carried by said arms, and means carried by said arms to increase or decrease the space between them.

2. In a device of the character described, the combination of a vertically disposed bar adapted to be secured to a plow beam, arms hinged to the lower end of said bar and disposed upon opposite sides of the plow beam, shafts carried by the lower ends of said arms, cutter disks mounted on each end of said shafts, and means carried by said arms to increase or decrease the space between them.

3. In a device of the character described, the combination of a vertically disposed bar, said bar being twisted so that the lower end is disposed in a plane at right angles to the body portion, curved arms hinged to the lower end of said bar and disposed upon opposite sides of the bar, cutting disks carried by the lower ends of said arms, a rod mounted on said arms, having a head formed on one end and a nut threaded on the other end, and a coil spring mounted on said rod and disposed between said arms to force them apart when the nut is unscrewed.

In testimony whereof I hereunto affix my signature in the presence of two witnesses.

WALTER E. HALLAWAY.

Witnesses:
W. H. HAMM,
J. J. CONE.

Copies of this patent may be obtained for five cents each, by addressing the " Commissioner of Patents, Washington, D. C."